United States Patent
Takahashi et al.

(10) Patent No.: US 8,120,331 B2
(45) Date of Patent: Feb. 21, 2012

(54) POWER SUPPLY DEVICE, SCANNER POWER SUPPLY DEVICE, AND IMAGE FORMING APPARATUS

(75) Inventors: Hiroyuki Takahashi, Kanagawa (JP); Yusuke Ozaki, Tokyo (JP); Eiji Nemoto, Tokyo (JP); Yuji Matsuda, Tokyo (JP); Hiroki Ohkubo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 786 days.

(21) Appl. No.: 12/206,248

(22) Filed: Sep. 8, 2008

(65) Prior Publication Data

US 2009/0072781 A1 Mar. 19, 2009

(30) Foreign Application Priority Data

Sep. 13, 2007 (JP) .................................. 2007-238109
Jul. 25, 2008 (JP) .................................. 2008-192831

(51) Int. Cl.
*H02J 7/00* (2006.01)

(52) U.S. Cl. ........................................ 320/166; 320/101

(58) Field of Classification Search ................... 320/166
See application file for complete search history.

(56) References Cited

U.S. PATENT DOCUMENTS

| | | | |
|---|---|---|---|
| 5,347,372 A | 9/1994 | Takahashi et al. | |
| 2004/0189780 A1* | 9/2004 | Sato | 347/118 |
| 2004/0218006 A1* | 11/2004 | Dickerson | 347/37 |

FOREIGN PATENT DOCUMENTS

| | | |
|---|---|---|
| JP | 3-87760 | 4/1991 |
| JP | 2004-88649 | 3/2004 |

* cited by examiner

*Primary Examiner* — Edward Tso
*Assistant Examiner* — Johali Torres Ruiz
(74) *Attorney, Agent, or Firm* — Oblon, Spivak, McClelland, Maier & Neustadt, L.L.P.

(57) ABSTRACT

A power supply device accumulates charges generated by a photovoltaic unit. The power supply device includes a first capacitor having a first capacitance, in which the charges generated by the photovoltaic unit are charged; a second capacitor having a second capacitance that is larger than the first capacitance; and a switching unit that switches between a first connection of connecting the photovoltaic unit to the first capacitor and a second connection of connecting the first capacitor to the second capacitor.

5 Claims, 10 Drawing Sheets

POWER SUPPLY DEVICE, SCANNER POWER SUPPLY DEVICE, AND IMAGE FORMING APPARATUS

CROSS-REFERENCE TO RELATED APPLICATIONS

The present application claims priority to and incorporates by reference the entire contents of Japanese priority document 2007-238109 filed in Japan on Sep. 13, 2007 and Japanese priority document 2008-192831 filed in Japan on Jul. 25, 2008.

BACKGROUND OF THE INVENTION

1. Field of the Invention

The present invention relates to a power supply device, a scanner power supply device, and an image forming apparatus.

2. Description of the Related Art

With the recent trend of digitalization of information, an image processing apparatus such as a printer and a facsimile for outputting digitalized data and a scanner for digitalizing documents has come to be an indispensable apparatus. Such image processing apparatus often includes an imaging function, an image forming function, a communication function, and the like to serve as a multifunction product usable as a printer, a facsimile, a scanner, and a copier. There are various demands for such image processing apparatus, one of which is saving power. To meet the demand, an image processing apparatus is proposed, for example, in Japanese Patent Application Laid-open No. 2004-88649, in which light emitted from a scanner light source is received by a photovoltaic mechanism used for a solar energy generation or the like to charge a standby power supply.

In the technology disclosed in Japanese Patent Application Laid-open No. 2004-88649, a storage unit such as a capacitor is charged by power generated by a photovoltaic unit that receives light from a scanner light source and is used as a standby power supply when the capacity of the storage unit has reached a predetermined voltage. However, because of the insufficient light converting efficiency of the photovoltaic unit and the shortage of an amount of irradiated light, a high current value as a generated electric current may not be ensured. In this case, it takes an extremely long time to charge the storage unit depending upon the capacity of the storage unit.

On the other hand, when the capacity of the storage unit is lowered, the storage unit can be charged to a predetermined voltage in a short time; however, only a small quantity of charges can be accumulated. Therefore, the storage unit works as a power supply for only a short time, which is not enough in performance as a standby power supply. Such problem occurs not only to the photovoltaic generation by a scanner light source of an image processing apparatus but also to charging of an electric power generating unit capable of outputting only small current.

SUMMARY OF THE INVENTION

It is an object of the present invention to at least partially solve the problems in the conventional technology.

According to one aspect of the present invention, there is provided a power supply device that accumulates charges generated by a photovoltaic unit. The power supply device includes a first capacitor having a first capacitance, in which the charges generated by the photovoltaic unit are charged; a second capacitor having a second capacitance that is larger than the first capacitance; and a switching unit that switches between a first connection of connecting the photovoltaic unit to the first capacitor and a second connection of connecting the first capacitor to the second capacitor.

Furthermore, according to another aspect of the present invention, there is provided a scanner power supply device that supplies power to a scanner that generates image data by optically scanning an original through a movement of a scanner head including a light source relative to the original. The scanner power supply device includes a moving unit that moves in accordance with the scanner head; and a main-body unit that is mounted on a main body of the scanner. The moving unit includes a photovoltaic unit that generates charges by receiving a light from the light source, a first charging unit having a first capacitance, in which the charges generated by the photovoltaic unit are charged, a first connecting terminal for electrically connecting the moving unit and the main-body unit, and a switching unit that switches between a connection of the photovoltaic unit to the first charging unit and a connection of the first charging unit to the first connecting terminal. The main-body unit includes a second connecting terminal for electrically connecting the moving unit and the main-body unit via the first connecting terminal, and a second charging unit having a second capacitance to which the charges in the first charging unit moves through the first connecting terminal and the second connecting terminal. The first connecting terminal and the second connecting terminal are connected when the scanner head is in a predetermined position with respect to the main body of the scanner. The switching unit connects the first charging unit to the first connecting terminal when the first connecting terminal is connected to the second connecting terminal.

Moreover, according to still another aspect of the present invention, there is provided an image forming apparatus including a scanner that generates image data by optically scanning an original through a movement of a scanner head including a light source relative to the original; and a power supply device that supplies power to the scanner. The power supply device includes a moving unit that moves in accordance with the scanner head, and a main-body unit that is mounted on a main body of the scanner. The moving unit includes a photovoltaic unit that generates charges by receiving a light from the light source, a first charging unit having a first capacitance, in which the charges generated by the photovoltaic unit are charged, first connecting terminal for electrically connecting the moving unit and the main-body unit, and a switching unit that switches between a connection of the photovoltaic unit to the first charging unit and a connection of the first charging unit to the first connecting terminal. The main-body unit includes a second connecting terminal for electrically connecting the moving unit and the main-body unit via the first connecting terminal, and a second charging unit having a second capacitance to which the charges in the first charging unit moves through the first connecting terminal and the second connecting terminal. The first connecting terminal and the second connecting terminal are connected when the scanner head is in a predetermined position with respect to the main body of the scanner. The switching unit connects the first charging unit to the first connecting terminal when the first connecting terminal is connected to the second connecting terminal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

A power supply device according to the embodiments supplies power to a scanner that scans an original image. The power supply device can be applied to any image forming apparatus that includes a scanning unit such as a copier, a facsimile, a scanner, and a multifunction product having a copier function, a facsimile function, and a scanner function in a housing as long as the power supply device supplies power to the scanning unit.

Figure 1:
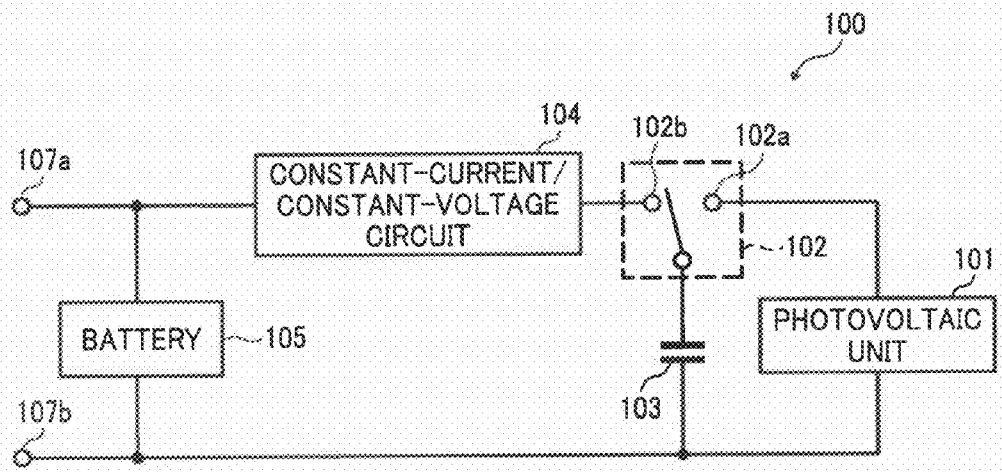
FIG. 1 is a circuit diagram of a power supply device according to a first embodiment of the present invention.

FIG. 1 is a circuit diagram of a power supply device 100 according to a first embodiment of the present invention. The power supply device 100 includes a photovoltaic unit 101, a switch circuit 102, a capacitor 103, a constant-current/constant-voltage circuit 104, a battery 105, and terminals 107a and 107b. The photovoltaic unit 101 converts light energy into electric power by photoelectric conversion function and is typically includes a solar battery. The capacitor 103 is a charging unit that is temporarily charged with power generated by the photovoltaic unit 101. The constant-current/constant-voltage circuit 104 controls current flowing in the battery 105 from the capacitor 103 to be constant or voltage of the battery 105 to be constant. The constant-current/constant-voltage circuit 104 switches between a constant current control and a constant voltage control in accordance with the voltage of the battery 105.

The battery 105 stores charges accumulated in the capacitor 103. Specifically, the battery 105 is a storage unit in which charges are finally accumulated in the power supply device 100. When the power supply device 100 is used as a standby power supply or the like, charges accumulated in the battery 105 are used. The switch circuit 102 includes a power-generating side terminal 102a and a power-storing side terminal 102b, to any one of which the capacitor 103 is connected. When the power-generating side terminal 102a is selected, the capacitor 103 is connected to the photovoltaic unit 101, so that power generated by the photovoltaic unit 101 is accumulated in the capacitor 103. When the power-storing side terminal 102b is selected, the capacitor 103 is connected to the constant-current/constant-voltage circuit 104 and the battery 105, so that charges accumulated in the capacitor 103 move to the battery 105. The terminals 107a and 107b are used for supplying power accumulated in the battery 105 to an apparatus that is a target for power supply.

Figure 2:
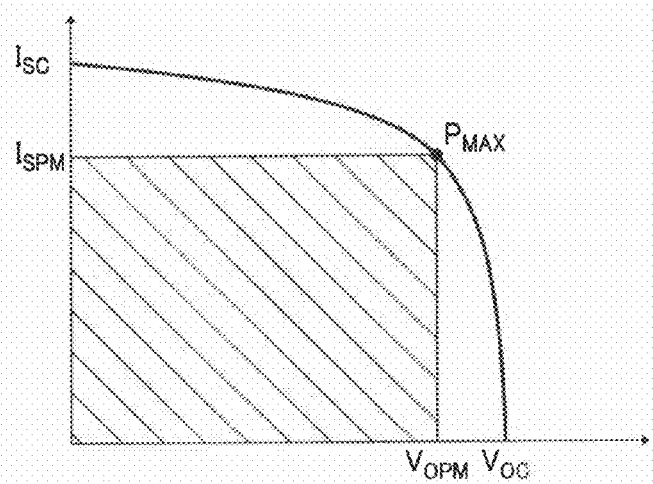
FIG. 2 is a graph representing output characteristics of a photovoltaic unit of the power supply device.

Output characteristics of the photovoltaic unit 101 are shown in FIG. 2. FIG. 2 is a graph representing the output characteristics of the photovoltaic unit 101 when the photovoltaic unit 101 is connected to a predetermined load and is irradiated with a predetermined amount of light, where the vertical axis represents current flowing to the load from the photovoltaic unit 101 and the horizontal axis represents voltage output from the photovoltaic unit 101. A current $I_{SC}$ is current flowing to the load from the photovoltaic unit 101 when the output is short-circuited, and a voltage $V_{OC}$ is voltage output from the photovoltaic unit 101 when the output is opened. When the switch circuit 102 selects the power-generating side terminal 102a and the photovoltaic unit 101 starts charging of the capacitor 103 that is not charged, current output from the photovoltaic unit 101 starts from the current $I_{SC}$ and decreases as the voltage output from the photovoltaic unit 101 increases in accordance with charges accumulated in the capacitor 103. When the voltage reaches the voltage $V_{OC}$, the photovoltaic unit 101 becomes a steady state.

The output (power) from the photovoltaic unit 101 can be obtained by multiplying a current value and a voltage value on the graph shown in FIG. 2. The output takes the maximum value at a point $P_{MAX}$ that defines a diagonal line of a rectangle of maximum area with an origin. The current value and the voltage value at the $P_{MAX}$ are set to $I_{SPM}$ and $V_{OPM}$ respectively.

Figure 3A:
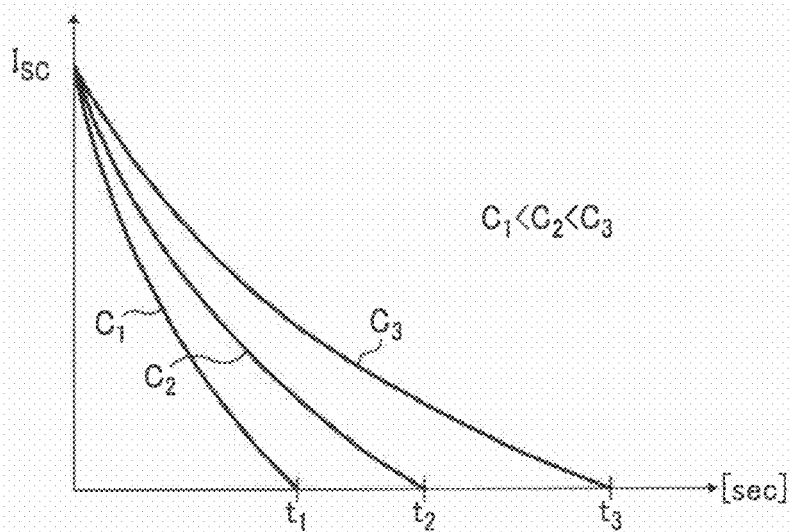
FIG. 3A is a graph representing charging characteristics of a capacitor of the power supply device, where the horizontal axis represents an elapsed time after the photovoltaic unit starts charging the capacitor and the vertical axis represents current output from the photovoltaic unit (current flowing in the capacitor)
Figure 3B:
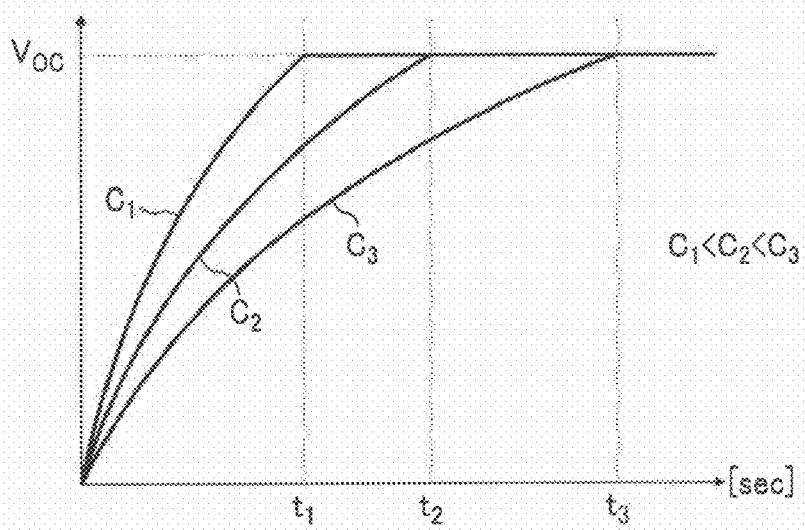
FIG. 3B is a graph representing charging characteristics of the capacitor, where the horizontal axis represents an elapsed time after the photovoltaic unit starts charging the capacitor and the vertical axis represents charging voltage of the capacitor.

FIGS. 3A and 3B are graphs representing a current change and a voltage change over time when the photovoltaic unit 101 charges the capacitor 103, respectively. FIG. 3A is a graph representing a change in current output from the photovoltaic unit 101 over time after the photovoltaic unit 101 starts charging the capacitor 103, and FIG. 3B is a graph representing a change in voltage output from the photovoltaic unit 101 (i.e., charging voltage of the capacitor 103) over time after the photovoltaic unit 101 starts charging the capacitor 103, each for three cases where capacitance of the capacitor 103 is $C_1$, $C_2$, and $C_3$ ($C_1<C_2<C_3$). In FIGS. 3A and 3B, $t_1$, $t_2$, and $t_3$ ($t_1<t_2<t_3$) represent charging time needed for charging the capacitors 103 having capacitance of $C_1$, $C_2$, and $C_3$, respectively.

As shown in FIGS. 3A and 3B, it takes a longer time to complete charging as the capacitance of the capacitor 103 becomes larger. The charging time is defined mainly by internal impedance of the photovoltaic unit 101 and time constant of the capacitor 103. In other words, when the capacitance of the capacitor 103 is large, a large quantity of charges can be accumulated; however, it takes a long time to charge the capacitor 103 to desired voltage. When the capacitance of the capacitor 103 is small, the capacitor 103 can be charged to desired voltage in a short time; however, the capacitor 103 can be charged with only a small quantity of charges. Moreover, when the current $I_{SC}$ that the photovoltaic unit 101 can output is low, it takes a long time to complete charging of the capacitor 103.

Figure 4:
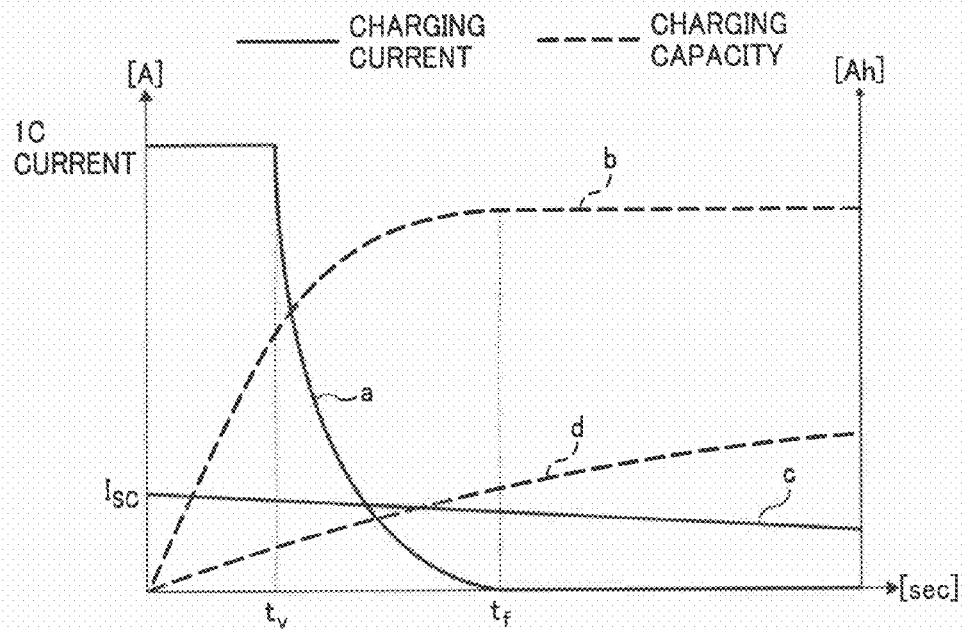
FIG. 4 is a graph representing charging characteristics of a battery of the power supply device.

Charging characteristics of the battery 105 are explained with reference to FIG. 4. FIG. 4 is a graph representing the charging characteristics of the battery 105, where the vertical axis represents charging current and charging capacity of the battery 105 and the horizontal axis represents an elapsed time after charging of the battery 105 is started. Four lines of "a" to "d" are shown in FIG. 4, in which the lines "a" and "b" relate to the first embodiment. The line "a" represents a change of the charging current in time sequence when the battery 105 is charged through the constant-current/constant-voltage circuit 104, and the line "b" represents a change of the charging capacity in time sequence when the battery 105 is charged with the charging current as shown by the line "a".

The battery 105 is charged under the control of the constant-current/constant-voltage circuit 104. With the constant-current/constant-voltage circuit 104, the battery 105 is charged at a constant current at first for a while after the charging of the battery 105 is started. At this time, the current value for the constant-current/constant-voltage circuit 104 to charge the battery 105 is set to a 1 C current. The 1 C current is defined based on the charging capacity of the battery 105 and is an allowable current value in the charging of the battery 105. In other words, the constant-current/constant-voltage circuit 104 limits the current flowing in the charging of the battery 105. The constant-current/constant-voltage circuit 104 detects a terminal voltage of the battery 105. When the charging voltage reaches a predetermined value at a timing $t_v$ shown in FIG. 4, the constant-current/constant-voltage circuit 104 switches from the constant-current charging to the constant-voltage charging. In this case, the constant-current/constant-voltage circuit 104 controls the battery 105 not to be charged over a predetermined voltage, i.e., a rating capacity. The charging capacity of the battery 105 reaches the rating capacity at a timing $t_f$ shown in FIG. 4, and then the charging of the battery 105 is completed.

The lines "c" and "d" shown in FIG. 4 relate to a comparison example of the first embodiment. The line "c" represents a change of the charging current in time sequence when the photovoltaic unit 101 directly charges the battery 105, and the line "d" represents a change of the charging capacity in time sequence when the battery 105 is charged through the constant-current/constant-voltage circuit 104 with the charging current as shown by the line "c". The current output from the photovoltaic unit 101 takes the maximum value of $I_{SC}$ that is lower than the 1 C current for a general charging battery. Therefore, as shown by the line "d" in FIG. 4, it takes an extremely long time to directly charge the battery 105 by the photovoltaic unit 101 to the rating capacity. In the first embodiment, the capacitor 103 is provided between the photovoltaic unit 101 and the battery 105, so that the battery 105 can be preferably charged by the photovoltaic unit 101 by adjusting the capacitance of the capacitor 103.

Figure 5:
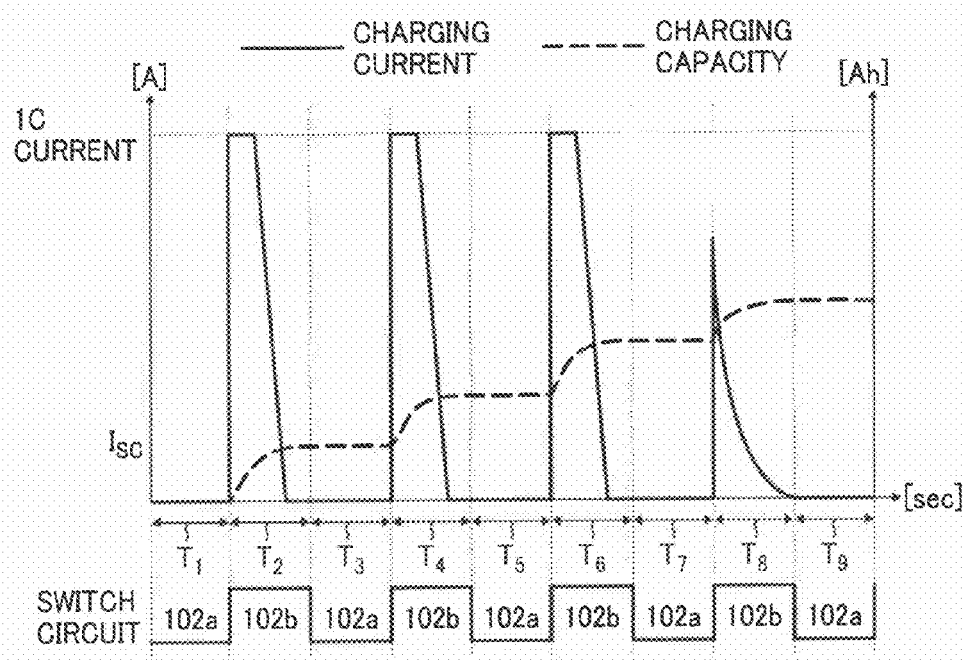
FIG. 5 is a graph representing a charging operation of the battery.

A charging operation by the power supply device 100 is explained. A graph and a timing chart representing the charging operation of the battery 105 are shown in FIG. 5. The graph shown in FIG. 5 represents a change of the charging current and the charging capacity of the battery 105 in time sequence. The time chart shown in FIG. 5 represents a terminal that the switch circuit 102 has selected out of the power-generating side terminal 102a and the power-storing side terminal 102b on a temporal axis that is common to the graph shown in FIG. 5. During time periods of $T_1$ to $T_9$ shown in FIG. 5, a predetermined amount of light is always radiated to the photovoltaic unit 101.

The switch circuit 102 switches connection of a selection terminal between the power-generating side terminal 102a (i.e., connection of the capacitor 103 to the photovoltaic unit 101) and the power-storing side terminal 102b (i.e., connection of the capacitor 103 to the battery 105) alternatively and regularly.

Specifically, the switch circuit 102 selects the power-generating side terminal 102a during the time period $T_1$. Therefore, the capacitor 103 is charged by the power generated by the photovoltaic unit 101. As explained above with reference to FIGS. 3A and 3B, the time needed for charging the capacitor 103 differs depending upon the capacitance of the capacitor 103. When the time needed for charging the capacitor 103 to the voltage $V_{OC}$ by the photovoltaic unit 101 is $T_{VOC}$, each of the time periods $T_1$, $T_3$, $T_5$, and $T_7$ is longer than the $T_{VOC}$. In other words, when the capacitor 103 is charged by the photovoltaic unit 101, the capacitance of the capacitor 103 is set so that the charging of the capacitor 103 is completed within each of the time periods $T_1$, $T_3$, $T_5$, and $T_7$.

When the switch circuit 102 selects the power-storing side terminal 102b in the next time period $T_2$, the capacitor 103 is connected to the battery 105 through the constant-current/constant-voltage circuit 104. Therefore, the charges accumulated in the capacitor 103 move to the battery 105, so that the battery 105 is charged. There is no limit on the current flowing in the capacitor 103 like the current $I_{SC}$ of the photovoltaic unit 101, so that the current flows in the capacitor 103 depending upon the voltage. Thus, the battery 105 can be charged with high efficiency compared with the example represented by the lines "c" and "d" in FIG. 4. In the charging of the battery 105 by the capacitor 103, the charging current is limited to the 1 C current as shown in the time period $T_2$ in FIG. 5 by the function of the constant-current/constant-voltage circuit 104.

When the voltage of the capacitor 103 decreases because of the movement of the charges accumulated in the capacitor 103 to the battery 105 and the voltage of the capacitor 103 gets closer to that of the battery 105, the charging current decreases as shown in FIG. 5. In other words, the charging current decreases in the time period T2 not because of the function of the constant-current/constant-voltage circuit 104 but because of the using up of the charges in the capacitor 103. The time period $T_2$ is preferably equal to or longer than the time period from the time when the charges start to move from the capacitor 103 to the battery 105 in a discharge state to the time when the current stops flowing from the capacitor 103 to the battery 105 due to the lowing of the voltage of the capacitor 103. Alternatively, the time period $T_2$ can be made equal to or longer than the time period until the current flowing from the capacitor 103 to the battery 105 becomes lower than a predetermined value. The predetermined value of the current is, for example, the 1 C current of the battery 105.

When the switch circuit 102 selects the power-generating side terminal 102a in the next time period $T_3$, the capacitor 103 is connected to the photovoltaic unit 101 again, so that the capacitor 103 is charged by the power generated by the photovoltaic unit 101 in the same manner as in the time period $T_1$. Next, when the switch circuit 102 selects the power-storing side terminal 102b in the time period $T_4$, the battery 105 is charged by the charges accumulated in the capacitor 103. As shown in FIG. 5, during the time period $T_4$, the battery 105 is charged in the superimposing manner to the charging capacity charged in the time period $T_2$. The charging voltage of the battery 105 does not reach a threshold for switching between the constant-current charging and the constant-voltage charging set in the constant-current/constant-voltage circuit 104 during the time period $T_4$, so that the charging current decreases with the lowering of the voltage of the capacitor 103.

In the next time period $T_5$, the capacitor 103 is charged by the power generated by the photovoltaic unit 101 in the same manner as in the time periods $T_1$ and $T_3$. In the next time period $T_6$, the battery 105 is charged by the charges accumulated in the capacitor 103 in the same manner as in the time periods $T_2$ and $T_4$. During the time period $T_6$, the battery 105 is charged in the superimposing manner to the charging capacity charged in the time period $T_4$. The charging voltage of the battery 105 reaches the threshold for switching between the constant-current charging and the constant-voltage charging set in the constant-current/constant-voltage circuit 104 in the time period $T_6$, so that the constant-current/constant-voltage circuit 104 switches the charging of the battery 105 from the constant-current charging to the constant-voltage charging. In other words, the charging current decreases in the time period $T_6$ because of the function of the constant-current/constant-voltage circuit 104 of switching from the constant-current charging to the constant-voltage charging. The charging capacity of the battery 105 does not reach the rating capacity during the time period $T_6$, so that the charging current decreases to zero with the lowering of the voltage of the capacitor 103.

In the next time period $T_7$, the capacitor 103 is charged by the power generated by the photovoltaic unit 101 in the same manner as in the time periods $T_1$, $T_3$ and $T_5$. In the next time period $T_8$, the battery 105 is charged by the charges accumulated in the capacitor 103 in the same manner as in the time periods $T_2$, $T_4$, and $T_6$. During the time period $T_8$, the battery 105 is charged in the superimposing manner to the charging capacity charged in the time period $T_6$. The charging voltage of the battery 105 has reached the threshold for switching between the constant-current charging and the constant-voltage charging set in the constant-current/constant-voltage circuit 104 in the time period $T_6$, so that the battery 105 is charged at a low voltage from the beginning in the time period $T_8$. In other words, the charging current is lower than the IC current at the beginning of the time period $T_8$ and decreases with the increase of the charging voltage of the battery 105. The charging capacity of the battery 105 reaches the rating capacity during the time period $T_8$, so that the charging of the battery 105 is completed.

As explained above, according to the power supply device 100 of the first embodiment, the capacitor 103 is charged promptly to the predetermined voltage value ($V_{OC}$ in the first embodiment) even when the maximum output current $I_{SC}$ is low by setting the capacitance of the capacitor 103 charged by the photovoltaic unit 101 to be lower than the capacity of the battery 105. Large-capacity charging can be performed by moving charges accumulated in the capacitor 103 to a battery having a relatively large capacity. Therefore, a storage unit can be preferably charged by a power generating unit that has a limit on an output current value. One example of the effects according to the first embodiment is a case where the battery 105 needs to be charged with the 1 C current or current close to it at the beginning of the charging by using the constant-current/constant-voltage circuit 104. When the battery 105 is directly charged by the photovoltaic unit 101, the charging current is limited to the current $I_{SC}$ as described above. When the current $I_{SC}$ is lower than the 1 C current, the battery 105 cannot be charged. However, according to the first embodiment, the current can flow to the battery 105 without the current being limited to the current $I_{SC}$.

Figure 6:
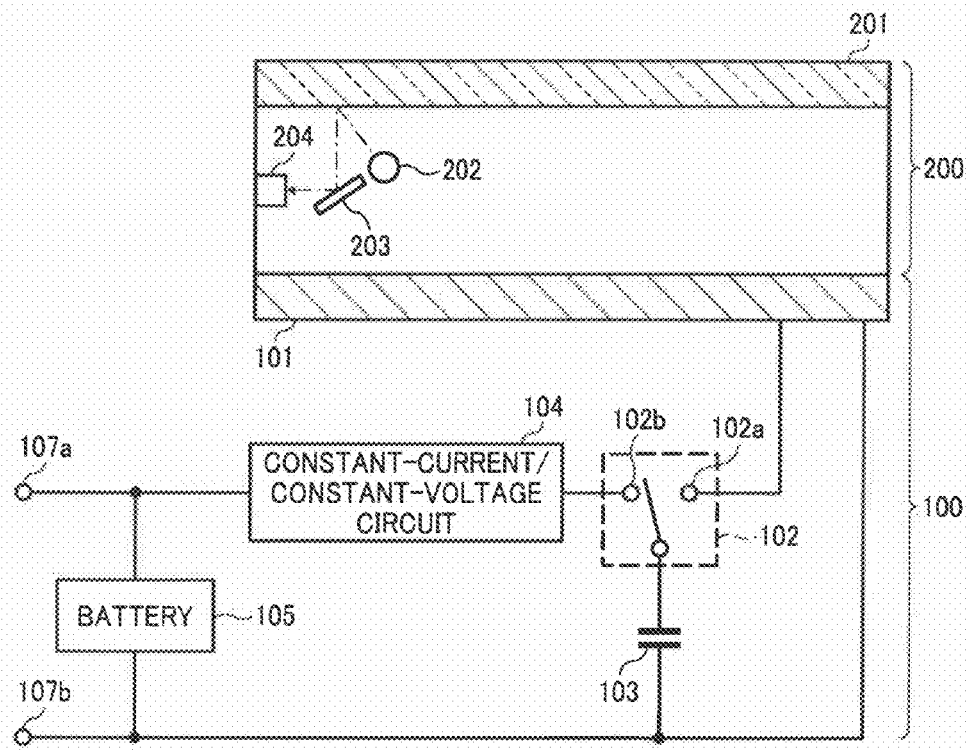
FIG. 6 is a circuit diagram of a case in which the power supply device is applied to a scanner.

FIG. 6 is a circuit diagram of a case in which the power supply device 100 is applied to a scanner 200 that optically scans an original to generate image dada thereof. The scanner 200 scans an original on an exposure glass 201 by light emitted from a light source 202 and guides the light reflected from the exposure glass 201 by a mirror 203 to a photoelectric converting unit 204, thereby generating image data on the original. In the scanner 200, the photovoltaic unit 101 is arranged so that it can receive light emitted from the light source 202. When the scanner 200 is operated and the light source 202 emits light, the photovoltaic unit 101 receives the light to generate power. The power in the battery 105 charged in the operation of the scanner 200 is used as a standby power supply for, for example, power-saving operation of an image processing apparatus that includes the scanner 200, so that usage of a commercial power supply can be reduced, enabling to save electric power.

Figure 7:
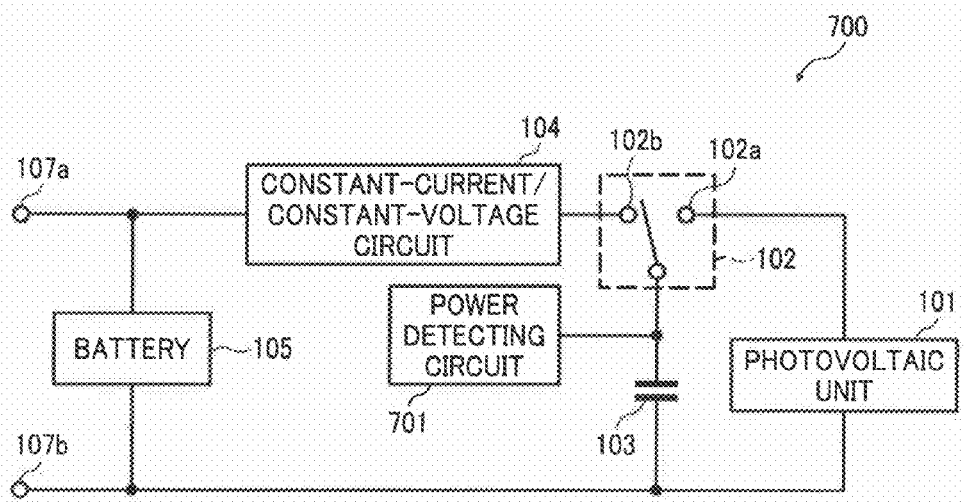
FIG. 7 is a circuit diagram of a power supply device according to a first modified example of the first embodiment.

As a first modified example of the first embodiment, switching of the selection terminal of the switch circuit 102 can be performed, for example, based on voltage of the capacitor 103. FIG. 7 is a circuit diagram of a power supply device 700 according to the first modified example of the first embodiment. The power supply device 700 has the configuration same as that of the power supply device 100 except that the power supply device 700 includes a power detecting circuit 701 that detects voltage of the capacitor 103.

In the state where the switch circuit 102 has selected the power-generating side terminal 102a, when the voltage of the capacitor 103 detected by the power detecting circuit 701 reaches a predetermined voltage, the switch circuit 102 switches to the power-storing side terminal 102b to move charges accumulated in the capacitor 103 to the battery 105. Therefore, charging of the capacitor 103 by the photovoltaic unit 101 is completed. Thus, it is possible to shorten the time in which the switch circuit 102 is on standby for switching the selection terminal, so that efficiency of charging the battery 105 can be improved.

Figure 8:
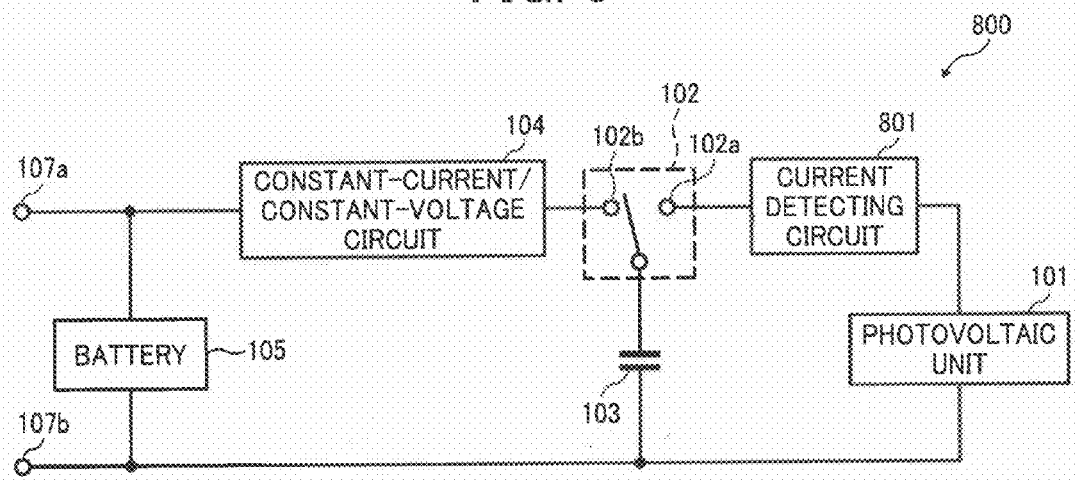
FIG. 8 is a circuit diagram of a power supply device according to a second modified example of the first embodiment.

As a second modified example of the first embodiment, switching of the selection terminal of the switch circuit 102 can be performed based on current flowing into the capacitor 103 from the photovoltaic unit 101. FIG. 8 is a circuit diagram of a power supply device 800 according to the second modified example of the first embodiment. The power supply device 800 has the configuration same as that of the power supply device 100 except that the power supply device 800 includes a current detecting circuit 801 that detects current flowing into the capacitor 103 from the photovoltaic unit 101.

In the state where the switch circuit 102 has selected the power-generating side terminal 102a, when the current of the capacitor 103 detected by the current detecting circuit 801 decreases to a predetermined current, the switch circuit 102 switches to the power-storing side terminal 102b to move charges accumulated in the capacitor 103 to the battery 105. Therefore, charging of the capacitor 103 by the photovoltaic unit 101 is completed. Thus, it is possible to shorten the time in which the switch circuit 102 is on standby for switching the selection terminal, so that efficiency of charging the battery 105 can be improved.

Figure 9:
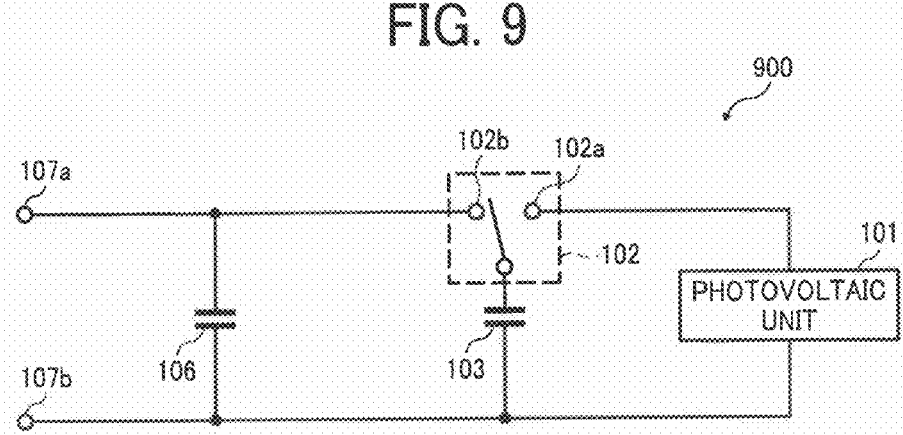
FIG. 9 is a circuit diagram of a power supply device according to a third modified example of the first embodiment.

In the first embodiment, the battery 105 is used as a charging unit in which charges are finally accumulated; however, other components can also be used as the storage unit. In a third modified example of the first embodiment, for example, a capacitor is used as the storage unit. FIG. 9 is a circuit diagram of a power supply device 900 according to the third modified example of the first embodiment. The power supply device 900 has the configuration same as that of the power supply device 100 except that the power supply device 900 includes a capacitor 106 instead of the battery 105 as the storage unit.

The capacitor 106 has capacitance larger than that of the capacitor 103. When the battery 105 is used as the storage unit, the constant-current/constant-voltage circuit 104 needs to be used for controlling the 1 C current. However, when the capacitor 106 is used, the 1 C current does not need to be controlled, so that the constant-current/constant-voltage circuit 104 can be omitted, enabling to improve productivity. Moreover, the charging current is not limited to the 1 C current, so that charges can be moved from the capacitor 103 with higher efficiency. The voltage of the capacitor 106 decreases in accordance with discharge of the accumulated charges, so that stability of supplying power is lowered. Accordingly, it is preferable to properly use both the battery 105 and the capacitor 106 depending upon use or the like of the power supply device 100.

In the first embodiment, the switch circuit 102 switches connection of the capacitor 103 between the photovoltaic unit 101 and the battery 105. In a second embodiment, when the power supply device 100 is applied to an image processing apparatus that includes a scanner, the above switching operation by the switch circuit 102 is performed differently from the first embodiment. The same components as those in the first embodiment are provided with the same reference numbers, and the explanations thereof are omitted herein.

Figure 10:
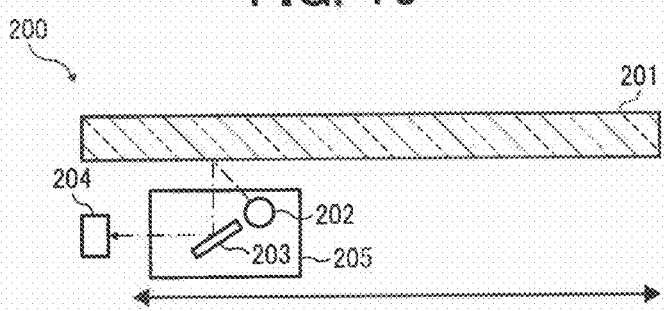
FIG. 10 is a schematic diagram of a scanner head and its periphery according to a second embodiment of the present invention.

FIG. 10 is a schematic diagram of a scanner head 205 and its periphery according to the second embodiment of the present invention. The scanner 200 scans an original on the exposure glass 201 by light emitted from the light source 202 and guides the light reflected from the exposure glass 201 by the mirror 203 to the photoelectric converting unit 204, thereby generating image data on the original. The scanner head 205 includes the light source 202 and the mirror 203. In the scan operation, the scanner head 205 moves relative to the exposure glass 201 to optically scan the whole surface of an original placed on the exposure glass 201.

As shown in FIG. 6 in the first embodiment, the photovoltaic unit 101 is arranged in a wider area to improve efficiency of receiving light emitted from the movable light source 202, which results in improving photovoltaic efficiency. However, arranging the photovoltaic unit 101 including a wide photodetector increases the cost, thereby lowering productivity. Therefore, the photodetector can be fixed to the light source 202 so that the photodetector moves together with the scanner head 205. However, a power supply device of the apparatus body needs to be connected to the power supply device 100 for supplying power charged by the power supply device 100 to the apparatus body as a target for power supply.

In the configuration of the power supply device 100 shown in FIG. 1, for example, the photovoltaic unit 101 is provided on the side of the scanner head 205, and other components are provided on the side of the apparatus body. In this case, considering the moving range of the scanner head 205, the wirings connecting the photovoltaic unit 101 with the switch circuit 102 and the capacitor 103 need to have sufficient length. Moreover, the wirings need to be thick considering increase in resistance due to the long length thereof. The thick wirings may mechanically interrupt movement of the scanner head 205, so that it is not preferable. When the components other than the photovoltaic unit 101 are provided on the side of the scanner head 205, the weight of the configuration that moves together with the scanner head 205 increases, which also mechanically interrupts the movement of the scanner head 205. The power supply device 100 according to the second embodiment solves the above problems, in which photovoltaic generation can be preferably performed by a scanner light source without interrupting the movement of a scanner head in a scanner that optically scans a whole surface of an original by moving the scanner head relative to the original.

Figure 11:
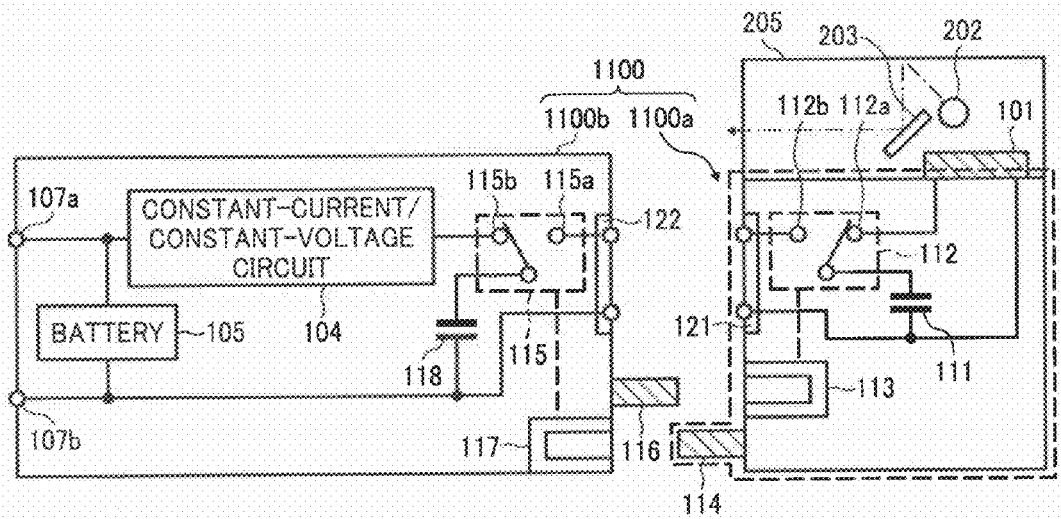
FIG. 11 is a circuit diagram of the scanner head and a power supply device according to the second embodiment of the present invention, in which a moving unit and a fixed unit are separated.
Figure 12:
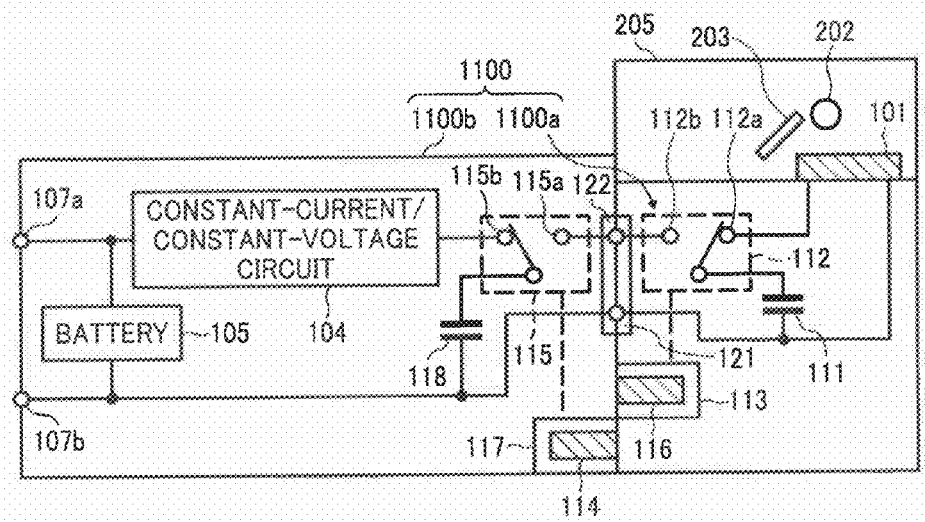
FIG. 12 is a circuit diagram of the scanner head and the power supply device according to the second embodiment of the present invention, in which the moving unit and the fixed unit are connected.

FIGS. 11 and 12 are circuit diagrams of the scanner head 205 and a power supply device 1100. The power supply device 1100 includes a moving unit 1100a and a fixed unit 1100b that can be separated. The moving unit 1100a and the fixed unit 1100b are separated in FIG. 11 and connected in FIG. 12. The moving unit 1100a is shown as surrounded by a dotted line in FIG. 11 and is fixed to the scanner head 205. When the scanner head 205 moves relative to the exposure glass 201, the moving unit 1100a moves integrally with the scanner head 205. The fixed unit 1100b is fixed to the scanner that is a target for power supply.

As shown in FIG. 11, the moving unit 1100a includes the photovoltaic unit 101, a capacitor 111, a switch circuit 112, a connection detecting switch 113, a protrusion 114, and a connecting terminal 121. The fixed unit 1100b includes the constant-current/constant-voltage circuit 104, the battery 105, a switch circuit 115, a protrusion 116, a connection detecting switch 117, a capacitor 118, and a connecting terminal 122. The capacitor 111 corresponds to the capacitor 103 in the first embodiment. That is, the capacitor 111 is temporarily charged with power generated by the photovoltaic unit 101. The capacitor 118 receives charges accumulated in the capacitor 111 and is temporarily charged in the state where the moving unit 1100a and the fixed unit 1100b are connected. In the second embodiment, the charges accumulated in the capacitor 118 move to the battery 105, so that the battery 105 is charged.

The switch circuit 112 includes a power-generating side terminal 112a and a fixed-unit side terminal 112b, and switches between the state in which the capacitor 111 is connected to the photovoltaic unit 101 and the state in which the capacitor 111 is connected to the connecting terminal 121. The switch circuit 115 includes a moving-unit side terminal 115a and a power-storing side terminal 115b, and switches between the state in which the capacitor 118 is connected to the connecting terminal 122 and the state in which the capacitor 118 is connected to the battery 105.

The connection detecting switch 113 detects connection of the moving unit 1100a with the fixed unit 1100b and switches the selection terminal of the switch circuit 112. The connection detecting switch 117 detects connection of the moving unit 1100a to the fixed unit 1100b and switches the selection terminal of the switch circuit 115. Each of the connection detecting switch 113 and the connection detecting switch 117 includes a concave. In the state where the moving unit 1100a is connected to the fixed unit 1100b, the protrusion 116 is inserted into the concave of the connection detecting switch 113 and the protrusion 114 is inserted into the concave of the connection detecting switch 117. In the state where the protrusion 116 is inserted into the concave of the connection detecting switch 113, the connection detecting switch 113 controls the switch circuit 112 to select the fixed-unit side terminal 112b. Moreover, in the state where the protrusion 114 is inserted into the concave of the connection detecting switch 117, the connection detecting switch 117 controls the switch circuit 115 to select the moving-unit side terminal 115a.

When the switch circuit 112 has selected the power-generating side terminal 112a, the capacitor 111 is connected to the photovoltaic unit 101, so that the power generated by the photovoltaic unit 101 is accumulated in the capacitor 111. In this case, the switch circuit 115 has selected the power-storing side terminal 115b, so that the battery 105 is charged by the charges accumulated in the capacitor 118. On the other hand, when the switch circuit 112 has selected the fixed-unit side terminal 112b, the capacitor 111 is connected to the connecting terminal 121, so that the charges accumulated in the capacitor 111 move to the fixed unit 1100b through the connecting terminal 121. In this case, the switch circuit 115 has selected the moving-unit side terminal 115a, so that the capacitor 118 is connected to the capacitor 111 through the connecting terminal 122. Accordingly, the charges accumulated in the capacitor 111 move to the capacitor 118 until the voltage of the capacitor 111 becomes equal to that of the capacitor 118.

As explained with reference to FIG. 10, the light source 202 emits light while the scanner head 205 moves relative to the exposure glass 201, thereby optically scanning an original on the exposure glass 201. The moving unit 1100a and the fixed unit 1100b are separated. Therefore, the switch circuit 112 has selected the power-generating side terminal 112a, so that the power generated by the photovoltaic unit 101 is accumulated in the capacitor 111. The switch circuit 115 has selected the power-storing side terminal 115b, so that the battery 105 is charged by the charges accumulated in the capacitor 118.

When the original has been scanned and the scanner head 205 is in a predetermined arrangement state with respect to the scanner body (at a home position), the moving unit 1100a and the fixed unit 1100b are connected. In this case, the switch circuit 112 has selected the fixed-unit side terminal 112b and the switch circuit 115 has selected the moving-unit side terminal 115a. Therefore, the capacitor 111 is connected to the capacitor 118 through the connecting terminals 121 and 122, so that the charges accumulated in the capacitor 111 move to the capacitor 118 until the voltage of the capacitor 118 becomes equal to that of the capacitor 111.

The capacitor 111 is charged until the voltage of the capacitor 111 becomes the voltage $V_{OC}$ by the photovoltaic unit 101. The movement of the charges from the capacitor 111 to the capacitor 118 stops when the voltage of the capacitor 118 becomes equal to that of the capacitor 111, so that the voltage of the capacitor 118 basically does not become equal to or higher than the voltage $V_{OC}$. Specifically, when the capacitance of the capacitor 111 is the same as that of the capacitor 118, the voltage of the capacitor 111 becomes equal to that of the capacitor 118 at the time half of the charges of the capacitor 111 move to the capacitor 118. In other words, the voltage of the capacitor 118 increases to half of the voltage $V_{OC}$. When the capacitance of the capacitor 111 is higher than that of the capacitor 118, the voltage of the capacitor 111 becomes equal to that of the capacitor 118 at the time less than half of the charges of the capacitor 111 move to the capacitor 118. In other words, the voltage of the capacitor 118 increases to a value higher than half of the voltage $V_{OC}$. When the capacitance of the capacitor 111 is lower than that of the capacitor 118, the voltage of the capacitor 111 becomes equal to that of the capacitor 118 at the time more than half of the charges of the capacitor 111 move to the capacitor 118. In other words, the voltage of the capacitor 118 does not increase to a value over half of the voltage $V_{OC}$.

Accordingly, it is preferable to appropriately adjust the capacitance of the capacitor 111 and that of the capacitor 118 in accordance with the voltage $V_{OC}$ that is the maximum voltage of the photovoltaic unit 101 and the voltage output from the battery 105 or the rating capacity of the switch circuit 115. For example, when the capacitance of the capacitor 111 is set higher than that of the capacitor 118, the charging voltage of the capacitor 118 can be made high. However, efficiency of charging the battery 105 is lowered due to a large quantity of charges remaining in the capacitor 111. On the other hand, when the capacitance of the capacitor 111 is set lower than that of the capacitor 118, the charges remaining in the capacitor 111 can be reduced. However, the charging voltage of the capacitor 118 is lowered.

In the scanner and the power supply device 1100 according to the second embodiment, when the scan operation is performed by the scanner, the power generated by the scanner light source is accumulated in the capacitor 111 that moves integrally with the scanner head 205. When the scan operation is not performed, the charges accumulated in the capacitor 111 move to the capacitor 118 provided on the side of the scanner body. When the scan operation is performed again, the battery 105 is charged by the charges accumulated in the capacitor 118 and the power generated by the scanner light source is accumulated in the capacitor 111. With this configuration, the photovoltaic generation can be appropriately performed by the scanner light source without mechanically interrupting the movement of the scanner head 205.

Figure 13:
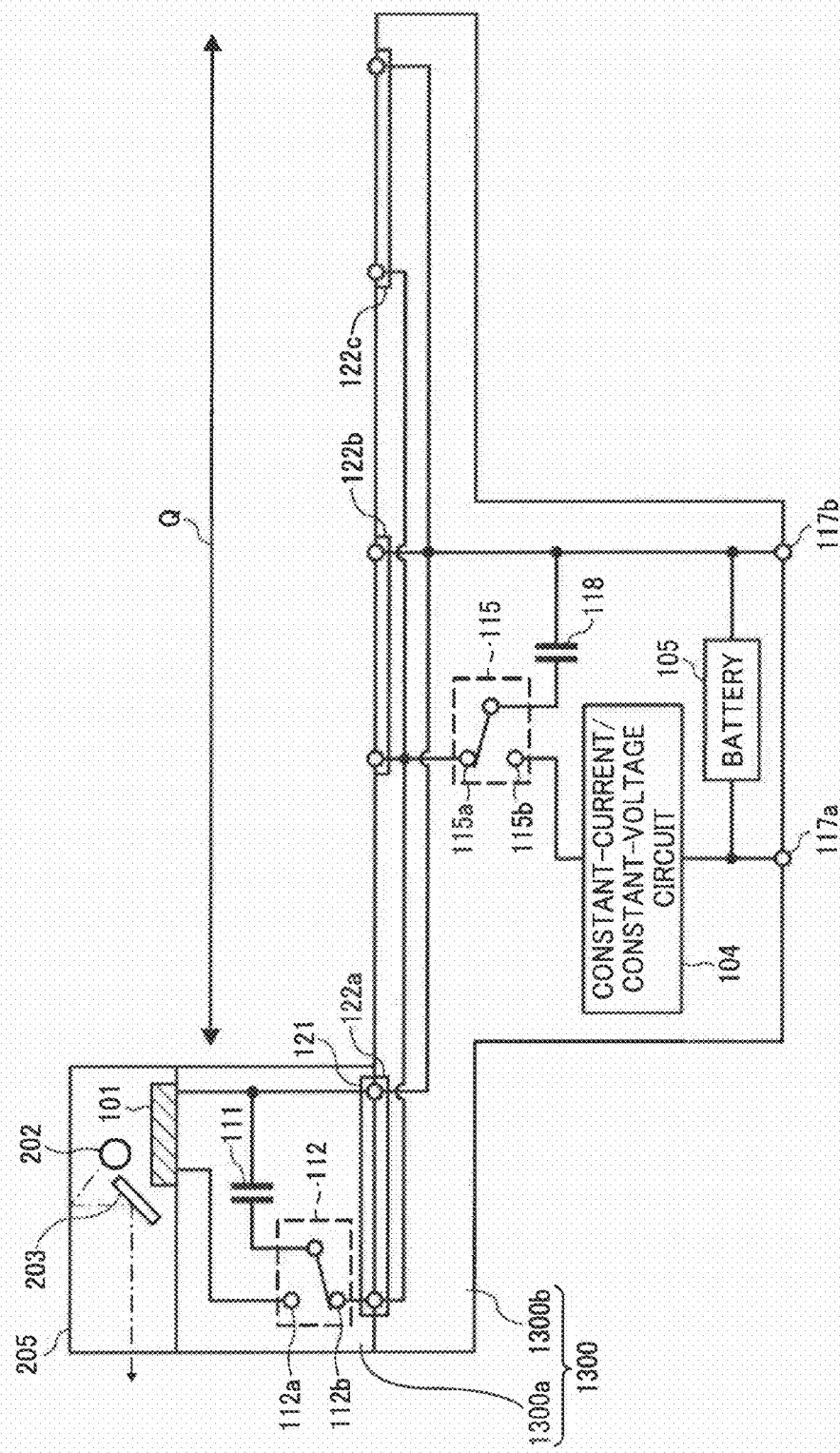
FIG. 13 is a circuit diagram of a scanner head and a power supply device according to a modified example of the second embodiment, in which a scan operation is not performed.

In the above explanation, the moving unit 1100a and the fixed unit 1100b are connected when the scanner head 205 is located at its home position in the state where the scan operation is not performed as an example. The moving unit 1100a and the fixed unit 1100b can be connected at a plurality of positions on a moving track of the scanner head 205, which is shown in FIG. 13 as a modified example of the second embodiment. As shown in FIG. 13, the connecting terminals 122a, 122b, and 122c to be connected to the connecting terminal 121 of a moving unit 1300a are provided on the moving track of the scanner head 205 at a plurality of positions.

In FIG. 13, arrangement state of the scanner head 205, and the moving unit 1300a and a fixed unit 1300b of a power supply device 1300 are illustrated in a state where the scan operation is not performed. In the power supply device 1300, the connecting terminal 121 is connected to the connecting terminal 122a when the scan operation is not performed. In this state, the switch circuit 112 has selected the fixed-unit side terminal 112b and the switch circuit 115 has selected the moving-unit side terminal 115a. Therefore, the charges accumulated in the capacitor 111 move to the capacitor 118. When the scan operation is started, the scanner head 205 and the moving unit 1300a move along a direction indicated by an arrow Q in FIG. 13, so that the connection of the connecting terminal 121 to the connecting terminal 122a is released, which state is shown in FIG. 14.

Figure 14:
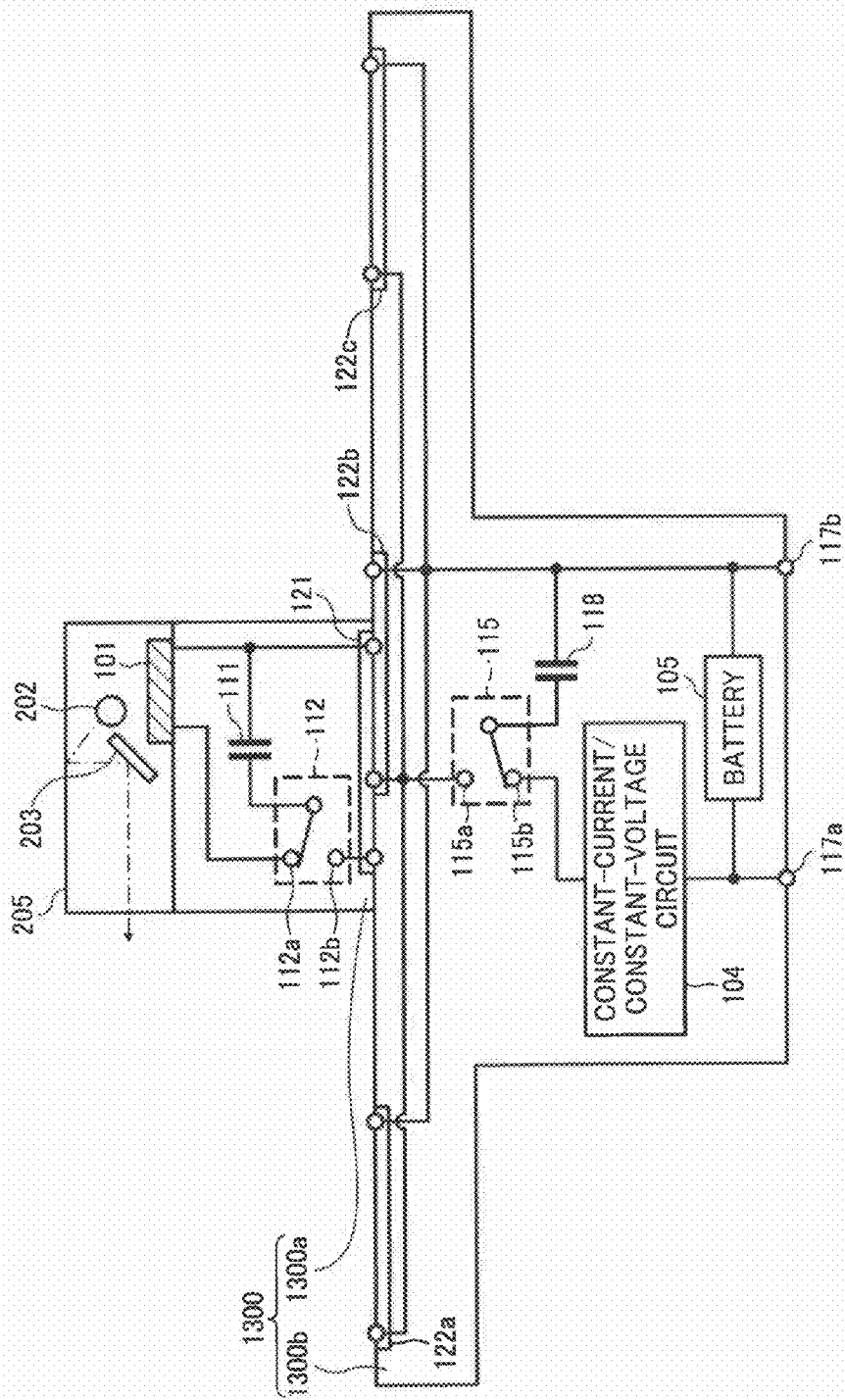
FIG. 14 is a circuit diagram of the scanner head and the power supply device according to the modified example of the second embodiment, in which connection of connecting terminals is released.

As shown in FIG. 14, when the scanner head 205 and the moving unit 1300a move and the connection of the connecting terminal 121 to the connecting terminal 122a is released, the switch circuit 112 selects the power-generating side terminal 112a and the switch circuit 115 selects the power-storing side terminal 115b. Therefore, the power generated by the photovoltaic unit 101 by receiving the light from the light source 202 is accumulated in the capacitor 111. Moreover, the battery 105 is charged by the charges accumulated in the capacitor 118.

Figure 15:
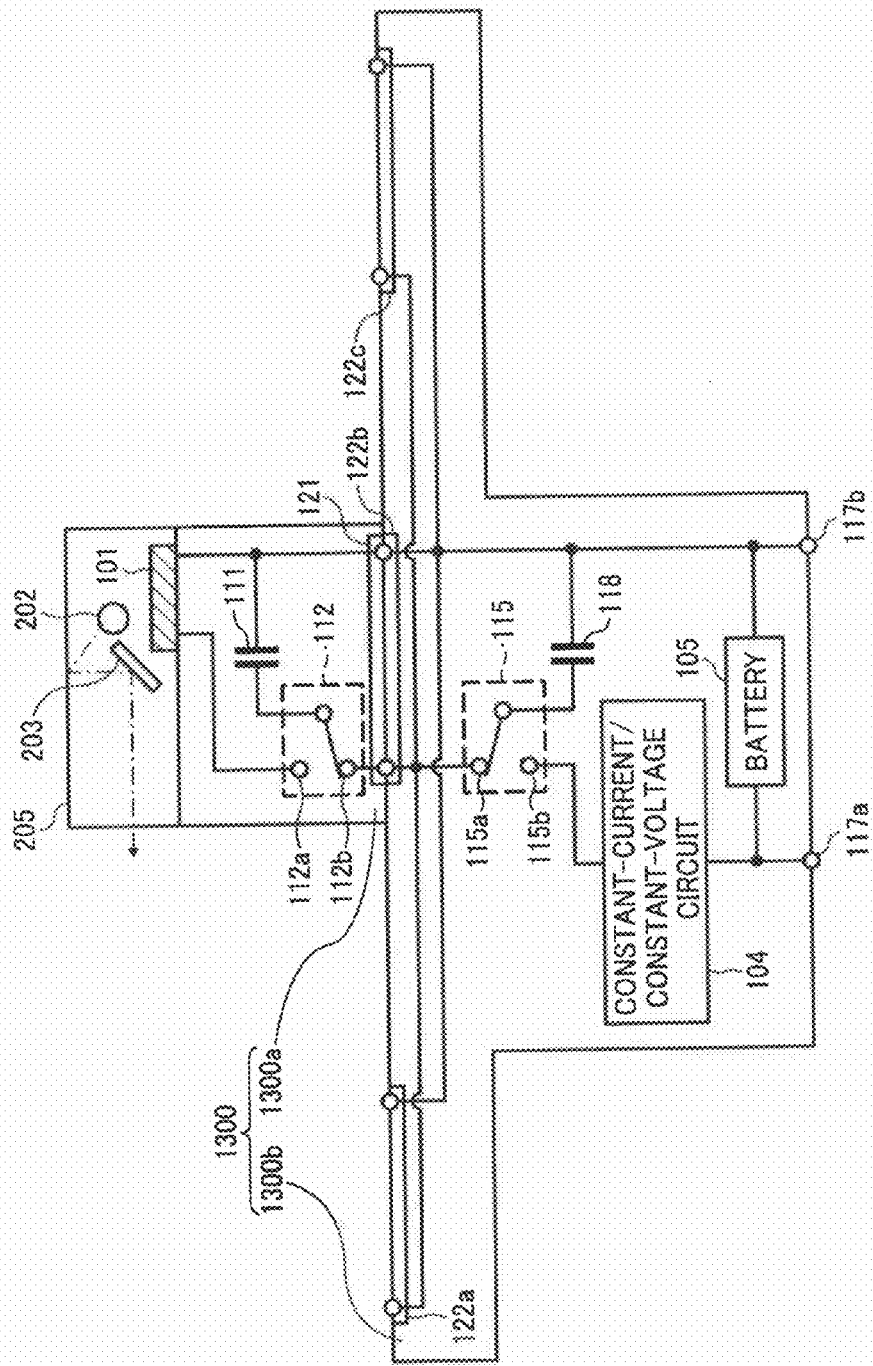
FIG. 15 is a circuit diagram of the scanner head and the power supply device according to the modified example of the second embodiment, in which the connecting terminals are connected.

When the scanner head 205 and the moving unit 1300a further move in the scan operation from the state shown in FIG. 14, the connecting terminal 121 comes to be connected to the connecting terminal 122b as shown in FIG. 15. In this case, the switch circuit 112 selects the fixed-unit side terminal 112b and the switch circuit 115 selects the moving-unit side terminal 115a. Accordingly, the charges that are accumulated in the capacitor 111 after the connection of the connecting terminal 121 to the connecting terminal 122a is released move to the capacitor 118. In this state also, the scanner head 205 and the moving unit 1300a are under the scan operation and continue their movement. Therefore, the connecting terminal 121 is connected to the connecting terminal 122b for an extremely short time. However, as explained in the first embodiment, when the charges in the capacitor 111 move to the capacitor 118, the current is not limited to the current $I_{SC}$ as the photovoltaic unit 101, so that the charges can move promptly.

When the scanner head 205 and the moving unit 1300a further move from the state shown in FIG. 15, the connection of the connecting terminal 121 to the connecting terminal 122b is released. Therefore, the switch circuit 112 selects the power-generating side terminal 112a and the switch circuit 115 selects the power-storing side terminal 115b same as those shown in FIG. 14. Thus, the power generated by the photovoltaic unit 101 by receiving light from the light source 202 is accumulated in the capacitor 111. Moreover, the battery 105 is charged by the charges accumulated in the capacitor 118. Thereafter, when the scanner head 205 and the moving unit 1300a further move, the connecting terminal 121 is connected to the connecting terminal 122c. In this case, the switch circuit 112 selects the fixed-unit side terminal 112b and the switch circuit 115 selects the moving-unit side terminal 115a same as those shown in FIG. 15. Thus, the connection of the connecting terminal 121 to the connecting terminal 122b is released, and then the charges accumulated in the capacitor 111 move the capacitor 118.

Figure 16A:
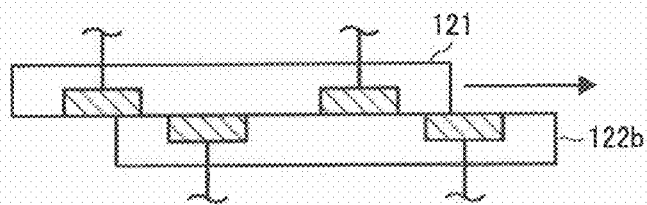
FIG. 16A is a schematic diagram of the connecting terminals and its periphery of the power supply device according to the modified example of the second embodiment, before the connecting terminals are connected.

The connecting terminal 121 and the connecting terminal 122b can be elongated in a direction in which the scanner head 205 and the moving unit 1300a move relative to the fixed unit 1300b to extend the time in which the connecting terminal 121 is connected to the connecting terminal 122b, which is shown in FIGS. 16A to 16E as an example. FIGS. 16A to 16E are schematic diagrams of the connecting terminals 121 and 122b and its periphery when the moving unit 1300a is moving relative to the fixed unit 1300b. FIG. 16A is a schematic diagram illustrating a state before the connecting terminals 121 and 122b are connected, which corresponds to the state shown in FIG. 14.

Figure 16B:
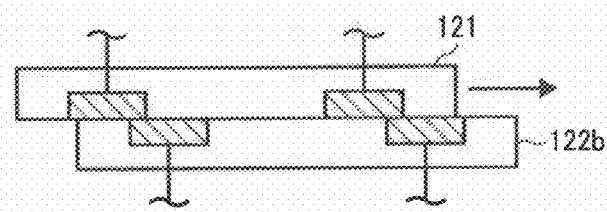
FIG. 16B is a schematic diagram of the connecting terminals and its periphery, in which the connecting terminals are connected.
Figure 16C:
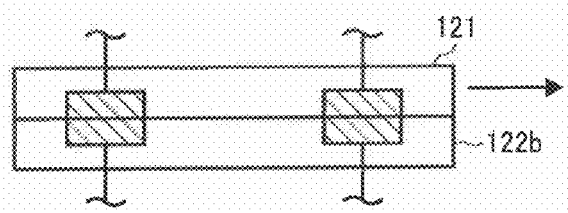
FIG. 16C is a schematic diagram of the connecting terminals and its periphery, in which the connecting terminals are connected.
Figure 16D:
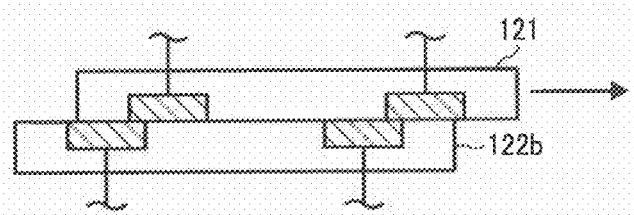
FIG. 16D is a schematic diagram of the connecting terminals and its periphery, in which the connecting terminals are connected.
Figure 16E:
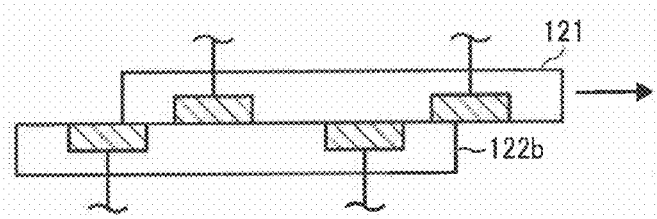
FIG. 16E is a schematic diagram of the connecting terminals and its periphery, in which connection of the connecting terminals is released.

When the moving unit 1300a further moves from the state shown in FIG. 16A and terminals of the connecting terminals 121 and 122b come into contact with each other as shown in FIG. 16B, the connecting terminals 121 and 122b become a state corresponding to that shown in FIG. 12. As shown in FIG. 16B, the terminals of the connecting terminals 121 and 122b are elongated in a direction in which the moving unit 1300a moves relative to the fixed unit 1300b. Therefore, even when the moving unit 1300a is moving relative to the fixed unit 1300b, the capacitor 111 is in contact with the capacitor 118 in the same manner as shown in FIG. 15 in the states shown in FIGS. 16A to 16D. When the moving unit 1300a further moves from the state shown in FIG. 16D, the connection of the connecting terminal 121 to the connecting terminal 122b is released as shown in FIG. 16E.

The switching of the selection terminals by the switch circuit 112 and the switch circuit 115 in the example shown in FIG. 13 can be controlled with time such as the time periods $T_1, T_2, \ldots, T_9$ as explained with reference to FIG. 5 in the first embodiment. In this case, the power-generating side terminal 102a and the power-storing side terminal 102b shown in FIG. 5 are replaced with the power-generating side terminal 112a and the fixed-unit side terminal 112b, respectively, in the control of switching the selection terminal of the switch circuit 112, and are replaced with the moving-unit side terminal 115a and the power-storing side terminal 115b, respectively, in the control of switching the selection terminal of the switch circuit 115.

Each of the time periods $T_1, T_2, \ldots, T_9$ is determined based on the time period from the time the connection of the connecting terminal 121 to the connecting terminal 122a is released to the time the connecting terminal 121 is connected to the connecting terminal 122b or the time period in which the connecting terminals 121 and 122b are connected, i.e., based on the speed in which the moving unit 1300a moves relative to the fixed unit 1300b. Alternatively, the time periods $T_1, T_2, \ldots, T_9$ can be switched by a mechanical switch in the same manner as the example shown in FIGS. 11 and 12.

In the above explanation, the capacitor 118 is provided to the fixed unit 1300b, the charges accumulated in the capacitor 111 move to the capacitor 118, and thereafter the switch circuit 115 is charged by the charges accumulated in the capacitor 118. Therefore, when the charges move from the side of the moving unit 1300a to the side of the fixed unit 1300b, the charges can move promptly without the limitation of the 1 C current of the battery 105. However, as explained with reference to FIGS. 16A to 16E, when the time needed for moving the charges in the capacitor 111 to the capacitor 118 is ensured, the capacitor 118 can be omitted. Moreover, charges remaining in the capacitor 111 can be reduced depending upon the capacity of the battery 105, so that charging efficiency can be improved.

In the above explanation, the moving unit 1300a is provided integrally with the scanner head 205. However, the moving unit 1300a can be provided separately from the scanner head 205. The effects same as the above can be obtained as long as the moving unit 1300a moves along with the movement of the scanner head 205.

According to one aspect of the present invention, a storage unit can be preferably charged by a power generating unit that has a limit on a current value to be output.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A scanner power supply device that supplies power to a scanner that generates image data by optically scanning an original through a movement of a scanner head including a light source relative to the original, the scanner power supply device comprising:
    a moving unit that moves in accordance with the scanner head; and
    a main-body unit that is mounted on a main body of the scanner, wherein
    the moving unit includes
        a photovoltaic unit that generates charges by receiving a light from the light source,
        a first charging unit having a first capacitance, in which the charges generated by the photovoltaic unit are charged,
        a first connecting terminal for electrically connecting the moving unit and the main-body unit, and
        a switching unit that switches between a connection of the photovoltaic unit to the first charging unit and a connection of the first charging unit to the first connecting terminal, and
    the main-body unit includes
        a second connecting terminal for electrically connecting the moving unit and the main-body unit via the first connecting terminal, and
        a second charging unit having a second capacitance to which the charges in the first charging unit moves through the first connecting terminal and the second connecting terminal,
    the first connecting terminal and the second connecting terminal are connected when the scanner head is in a predetermined position with respect to the main body of the scanner, and
    the switching unit connects the first charging unit to the first connecting terminal when the first connecting terminal is connected to the second connecting terminal.

2. The scanner power supply device according to claim 1, wherein
    the second connecting terminal includes a plurality of second connecting terminals provided on the main-body unit, and
    the first connecting terminal is respectively connected to the second connecting terminals at a plurality of positions while the scanner head moves relative to the original.

3. The scanner power supply device according to claim 2, wherein the second capacitance is larger than the first capacitance.

4. The scanner power supply device according to claim 2, further comprising:
    a third capacitor that supplies power to the main body of the scanner;
    a charge moving unit that moves the charges in the second charging unit to the third capacitor; and
    a current limiting unit that limits a current flowing from the second charging unit to the third capacitor to equal to or lower than a predetermined value, wherein
    each of the first charging unit and the second charging unit includes a capacitor.

5. An image forming apparatus comprising:
    a scanner that generates image data by optically scanning an original through a movement of a scanner head including a light source relative to the original; and
    a power supply device that supplies power to the scanner, wherein
    the power supply device includes
        a moving unit that moves in accordance with the scanner head, and a main-body unit that is mounted on a main body of the scanner
    the moving unit includes
        a photovoltaic unit that generates charges by receiving a light from the light source,
        a first charging unit having a first capacitance, in which the charges generated by the photovoltaic unit are charged,
        a first connecting terminal for electrically connecting the moving unit and the main-body unit, and
        a switching unit that switches between a connection of the photovoltaic unit to the first charging unit and a connection of the first charging unit to the first connecting terminal,
    the main-body unit includes
        a second connecting terminal for electrically connecting the moving unit and the main-body unit via the first connecting terminal, and
        a second charging unit having a second capacitance to which the charges in the first charging unit moves through the first connecting terminal and the second connecting terminal,
    the first connecting terminal and the second connecting terminal are connected when the scanner head is in a predetermined position with respect to the main body of the scanner, and
    the switching unit connects the first charging unit to the first connecting terminal when the first connecting terminal is connected to the second connecting terminal.

* * * * *